United States Patent [19]

Nakazono et al.

[11] 4,179,721
[45] Dec. 18, 1979

[54] TAPE RECORDER HAVING PLAYBACK RETAINING MECHANISM

[75] Inventors: Akio Nakazono; Shizuo Nakamura, both of Nagoya, Japan

[73] Assignee: Shin-Shirasuna Electric Corporation, Aichi, Japan

[21] Appl. No.: 847,223

[22] Filed: Oct. 31, 1977

[30] Foreign Application Priority Data

Nov. 8, 1976 [JP] Japan .................. 51-149881[U]
Nov. 24, 1976 [JP] Japan .................. 51-157190[U]
Feb. 18, 1977 [JP] Japan .................. 52-19237[U]
Feb. 18, 1977 [JP] Japan .................. 52-19238[U]

[51] Int. Cl.² .................................. G11B 15/04
[52] U.S. Cl. ........................................ 360/137
[58] Field of Search .................. 360/137, 72, 93, 96, 360/62

[56] References Cited

U.S. PATENT DOCUMENTS 3,947,895  3/1976  Suzuki ................... 360/137
4,003,087  1/1977  Iwasaki ................. 360/137
4,081,849  3/1978  Onishi .................. 360/137

OTHER PUBLICATIONS

"Kenwood Stereo Cassette Deck" Ad, 8/1/75, for Models KX-910/KX-710.

Primary Examiner—Jay P. Lucas
Attorney, Agent, or Firm—Schwartz, Jeffery, Schwaab, Mack, Blumenthal & Koch

[57] ABSTRACT

In an operating mechanism of a tape recorder, there is provided means for preventing the play-back operation from being released by the cue or the review being effected and for permitting the play-back operation to be resumed immediately after the cue or the review is interrupted. There is also provided means for ensuring that the recording lever and the review lever or the cue lever, if pushed in at the same time, are automatically returned to their non-pushed-in position upon release of the push-in force.

4 Claims, 18 Drawing Figures

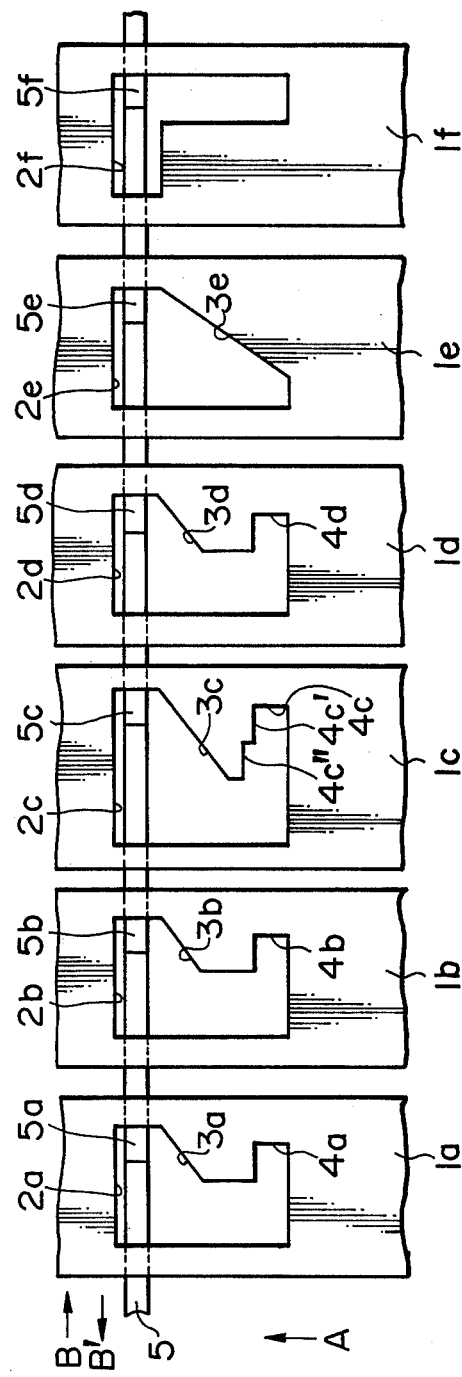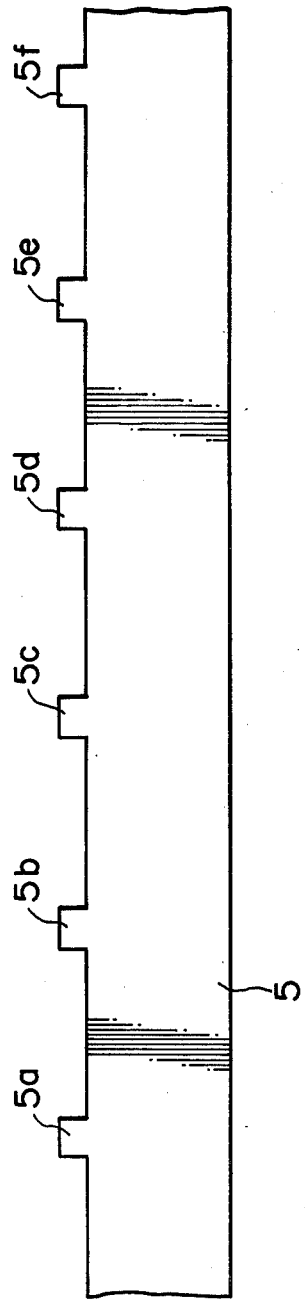

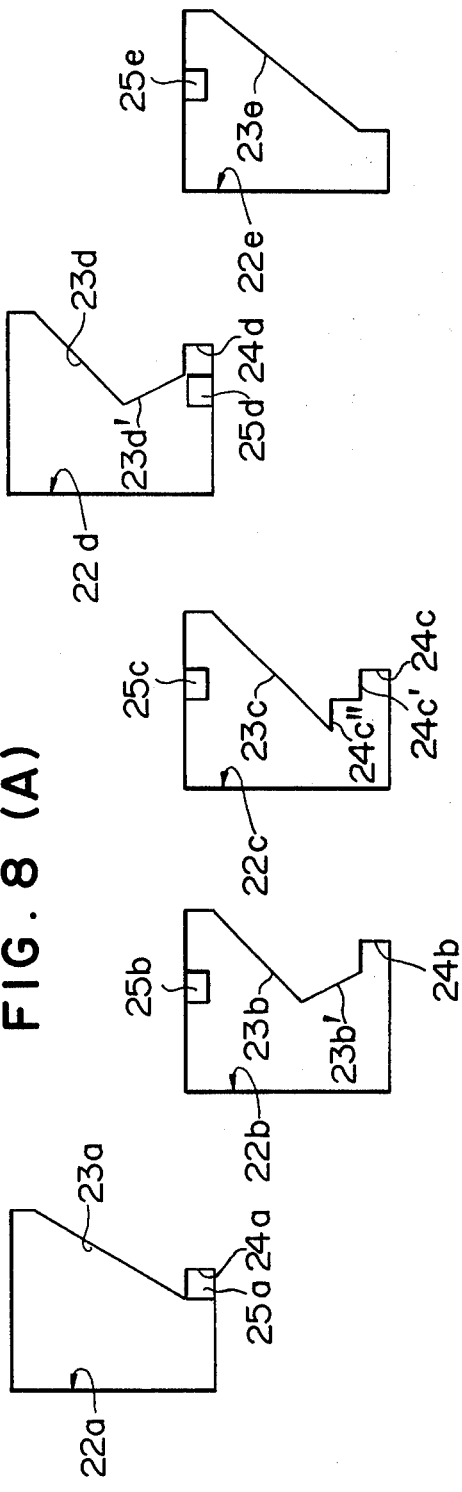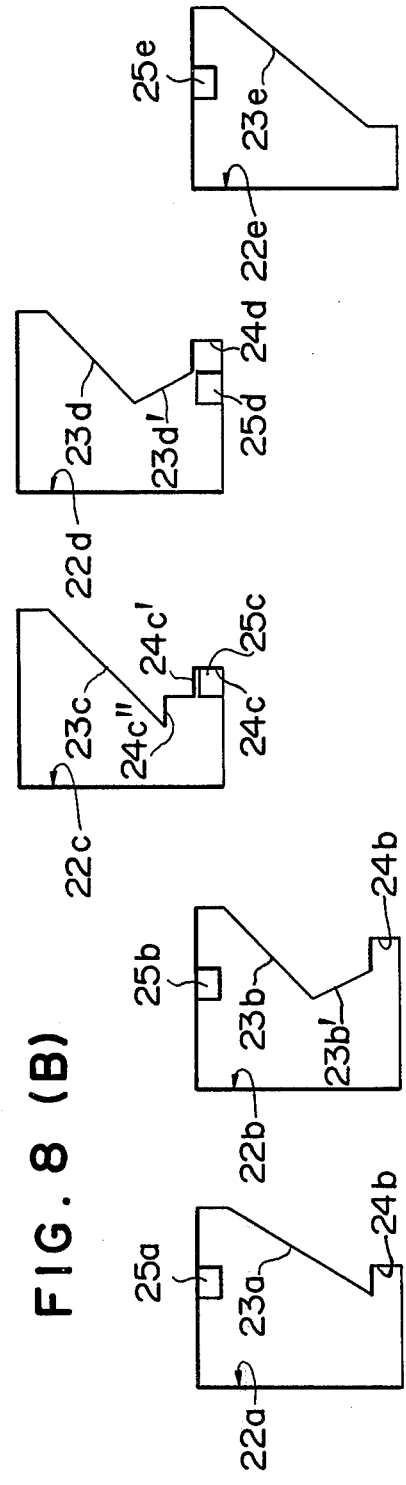
FIG. 8 (A)
FIG. 8 (B)

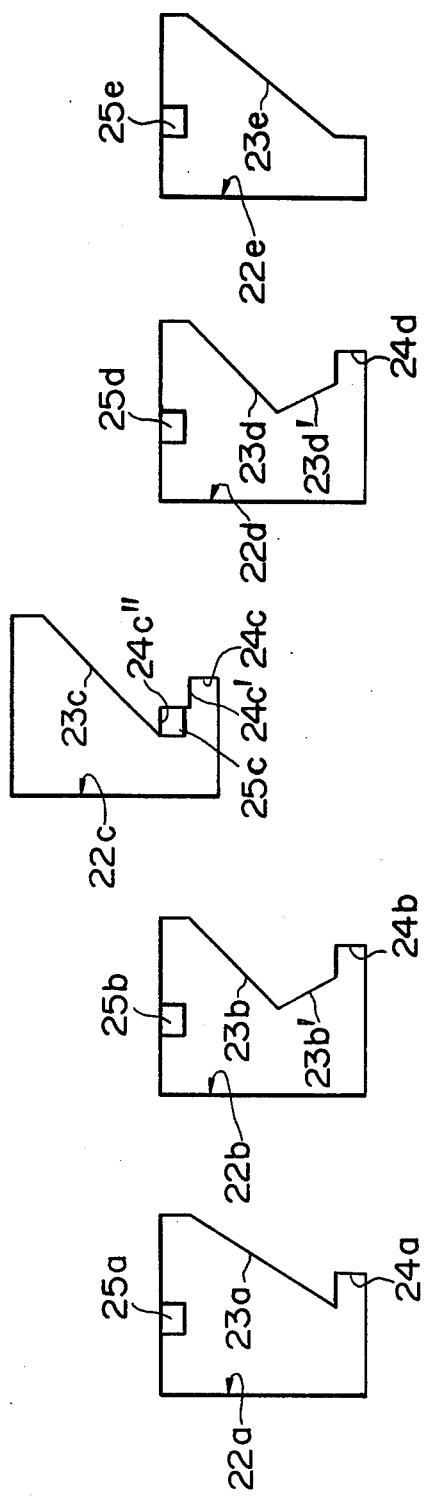

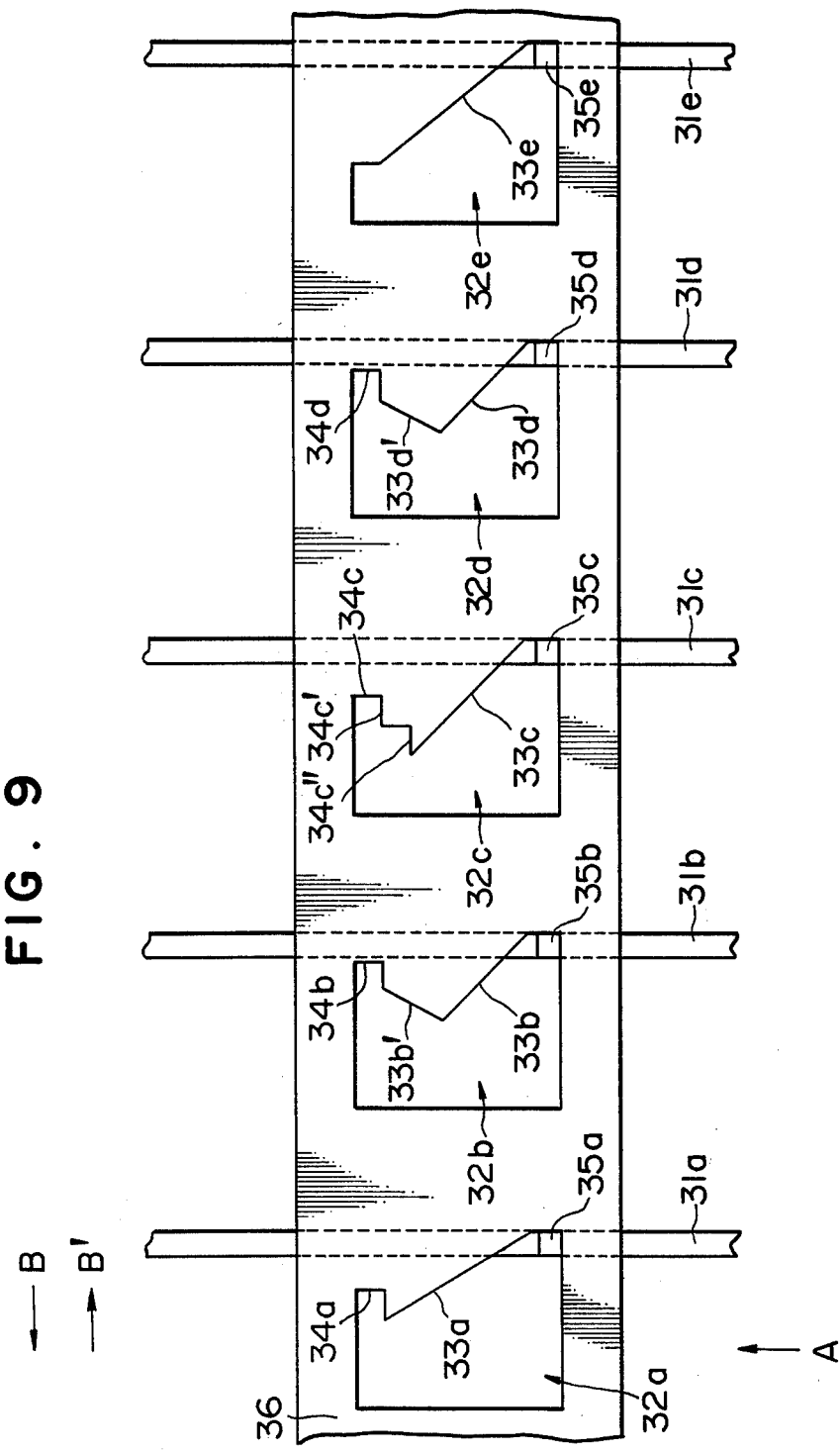

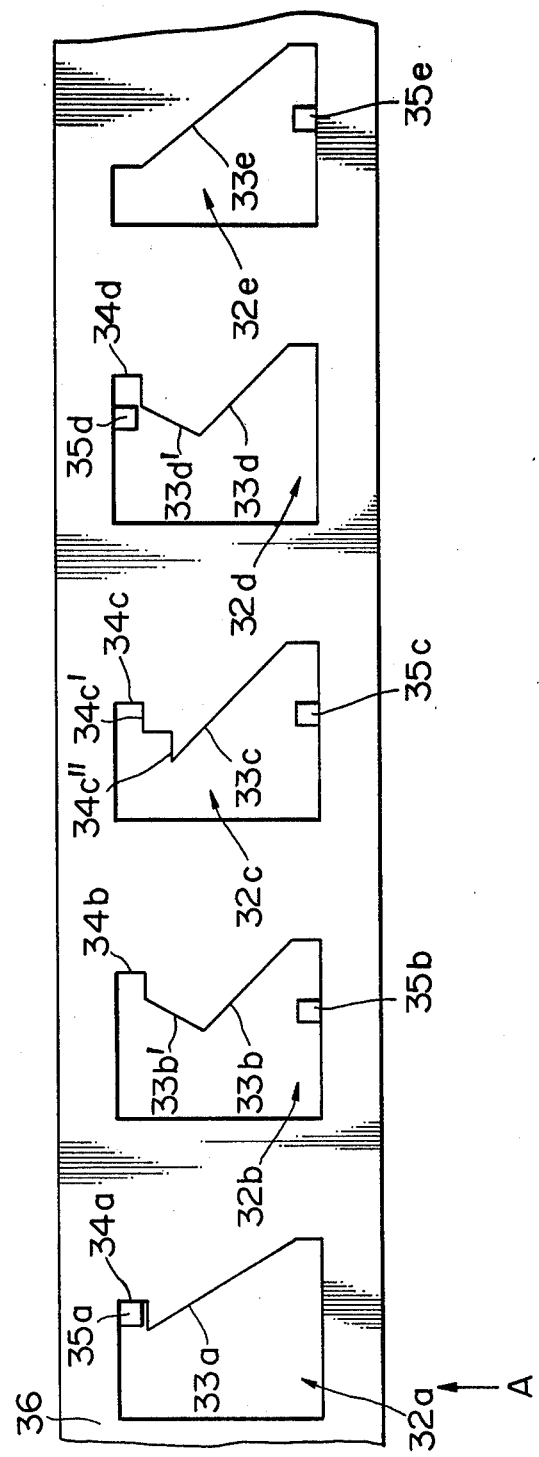

TAPE RECORDER HAVING PLAYBACK RETAINING MECHANISM

This invention relates to an operating mechanism of a tape recorder.

Tape recorders have been put into use which have the functions of enabling fast forward movement (cue) or rewind (review) of the tape during recording or play-back operation and include operating levers such as recording lever, play-back lever, review lever, cue lever, etc. each having one end portion projected from one side of the housing and capable of being pushed in against a spring force and in which the recording operation may be started as by pushing in the recording lever and the play-back lever at the same time. In such a tape recorder, it is required that the play-back operation be not released by the cue or the review being effected and that the play-back operation be resumed immediately after the cue or the review is interrupted. Further, in such a tape recorder, the recording lever and the play-back lever should properly be pushed in to start the recording operation as noted above, whereas if the recording lever and the review lever or the cue lever were pushed in by mistake and if one or both of these levers were held in their pushed-in position, there might be a possibility for the operator to misconceive that the recording operation was started thereby. It is therefore desired to make such a design that the recording lever and the review lever or the cue lever, if pushed in at the same time, are automatically returned to their non-pushed-in position upon release of the push-in force. Also, in the tape recorders as described above, it is sometimes desired that a desired recorded portion of the tape can be quickly reached by the review or the cue operation to play-back the recorded portion immediately.

It is therefore an object of this invention to provide an operating mechanism of a tape recorder which involves only a small number of parts and may reliably perform the above-mentioned functions and satisfy the above-noted desires by a simple construction.

Other objects, features and advantages of the present invention will become apparent from the following description taken in conjunction with the accompanying drawings.

FIG. 1 is a fragmentary schematic plan view showing the essential portions of the operating mechanism of a tape recording according to an embodiment of this invention.

FIG. 2 is a front view showing an example of the slider bar usable in the mechanism shown in FIG. 1.

Figure 3A:
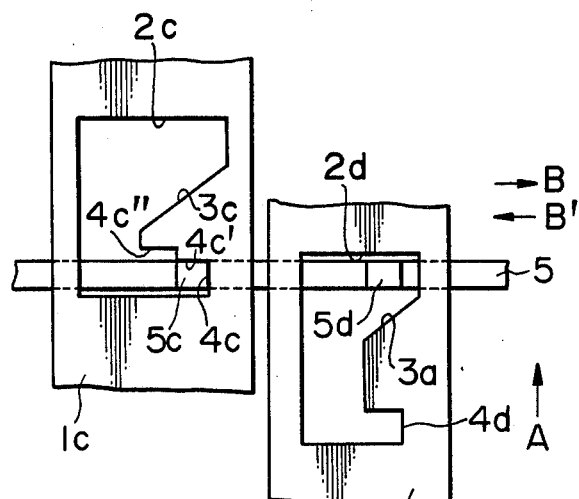
Figure 3B:
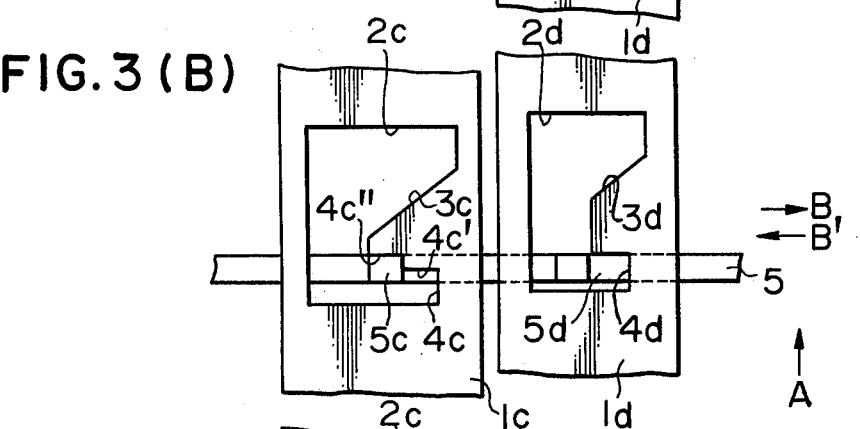
Figure 3C:
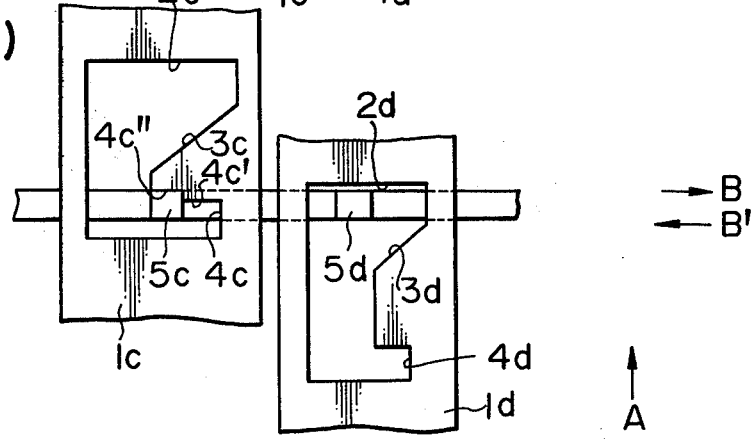

FIGS. 3(A) to (C) are views useful for explaining the operation of the mechanism shown in FIG. 1.

Figure 4:
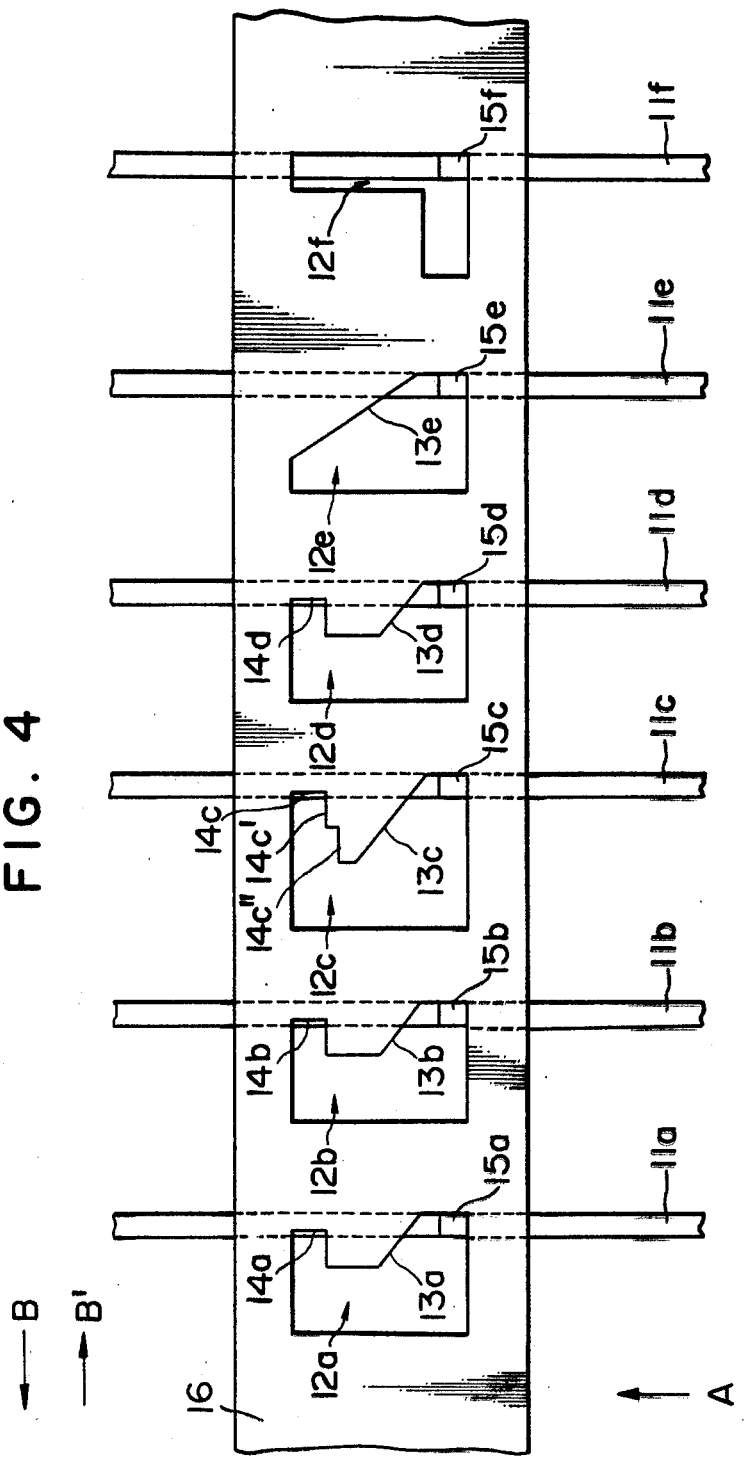

FIG. 4 is a fragmentary schematic plan view showing the essential portions of the operating mechanism of a tape recorder according to a second embodiment of this invention.

FIGS. 5(A) to (C) are views useful for explaining the operation of the mechanism shown in FIG. 4.

Figure 6:
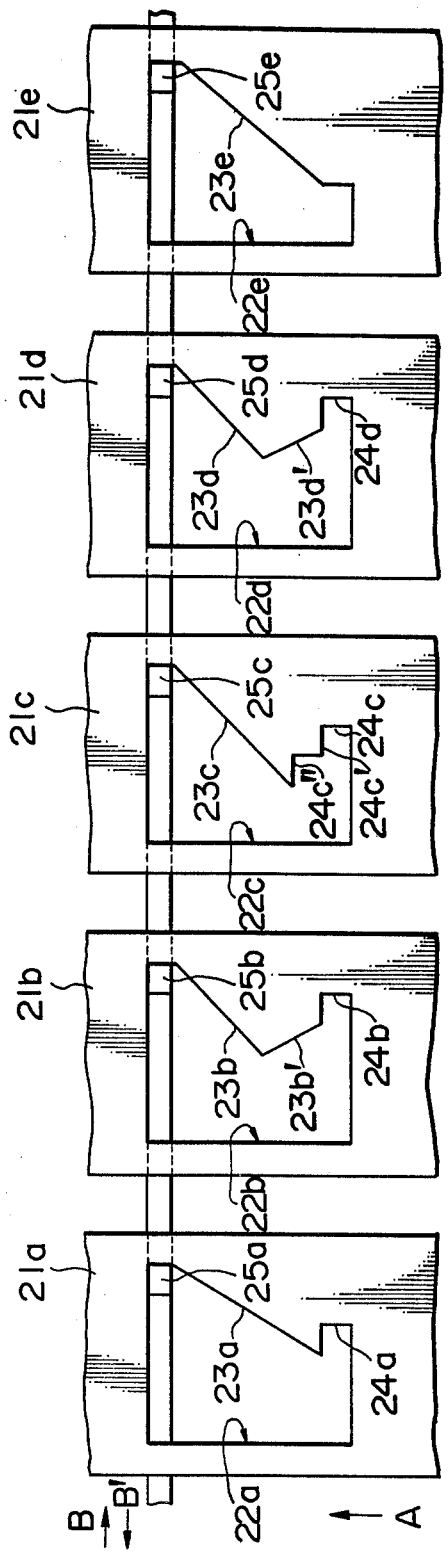

FIG. 6 is a fragmentary schematic plan view showing the essential portions of the operating mechanism of a tape recorder according to a third embodiment of this invention.

Figure 7:
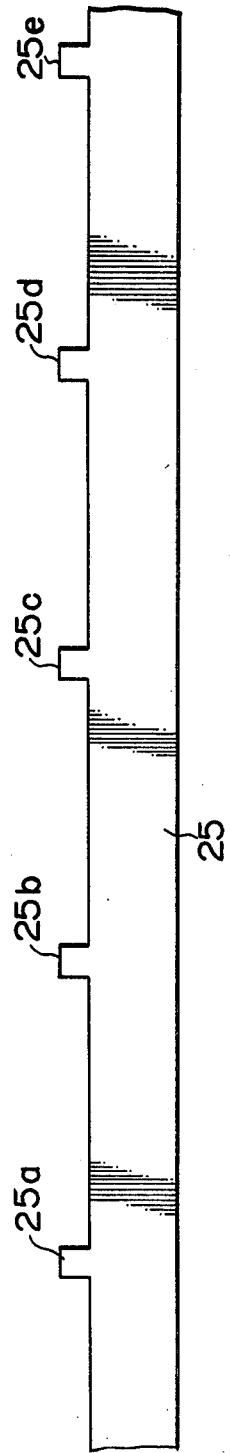

FIG. 7 is a front view showing an example of the slider bar usable in the mechanism shown in FIG. 6.

FIGS. 8(A) to (C) are views useful for explaining the operation of the mechanism shown in FIG. 1.

FIG. 9 is a fragmentary schematic plan view showing the essential portions of the operating mechanism of a tape recorder according to a fourth embodiment of this invention.

FIGS. 10(A) to (C) are views useful for explaining the operation of the mechanism shown in FIG. 9.

Referring to FIGS. 1 to 3, there is shown an embodiment of this invention, wherein reference characters $1a$ to $1f$ designate a recording lever, a review lever, a play-back lever, a cue lever, a stop lever and an eject lever each having one end portion (lower end portion as viewed in FIG. 1) projected from a side wall of a chassis (not shown) and capable of being pushed in the direction of arrow A against the bias force of a spring. These levers $1a$ to $1f$ are formed with through-apertures $2a$ to $2f$ configured as shown in FIG. 1. The through-apertures $2a$, $2b$ and $2d$ formed in the recording lever $1a$, the review lever $1b$ and the cue lever $1d$, respectively, may be similar in configuration and are provided with inclined edges $3a$, $3b$ and $3d$ and restraining recesses $4a$, $4b$ and $4d$. The through-aperture $2e$ in the stop lever $1e$ has an inclined edge $3e$ but is formed with no restraining recess like those mentioned above. The through-aperture $2f$ in the eject lever $1f$ is formed in an inverted L-shape. The through-aperture $2c$ in the play-back lever $1c$ has an inclined edge $3c$ and a restraining recess $4c$, and it should be noted that the restraining recess $4c$ is provided with two stepped portions $4c'$ and $4c''$ at the forward edge thereof.

Below the levers $1a$ to $1f$ (as viewed in FIG. 1), a slider bar 5 extends transversely of and perpendicularly to those levers and is slidable in a plane orthogonal to the surfaces of those lever. The slider bar 5 is spring-biased in the direction of arrow B. The slider bar 5 has projections $5a$ to $5f$ formed integrally therewith, as shown in FIG. 2, and these projections $5a$ to $5f$ are inserted in the through-apertures $2a$ to $2f$, respectively.

Operation of this embodiment will now be described. First, to effect play-back operation, the play-back lever $1c$ is pushed in. Thereupon, the inclined edge $3c$ of the through-aperture $2c$ in that lever comes into engagment with the projection $5c$, and as the lever $1c$ is pushed in, the slider bar 5 is slidden in the direction of arrow B' against the spring bias; when the lever $1c$ has been fully pushed in, the projection $5c$ is inserted into the restraining recess $4c$ of the lever $1c$ by the spring bias and engaged with the first stepped portion $4c'$ of that recess, thus bringing about a position as shown in FIG. 3(A). In this manner, the position for play-back operation is brought about. In such position, if it is desired to effect the cue, the cue lever $1d$ may be pushed in. By this, the inclined edge $3d$ of the through-aperture $2d$ in the lever $1d$ is brought into engagement with the projection $5d$, so that the slider bar 5 is slidden in the direction of arrow B' from the position of FIG. 3(A) to a position in which the projection $5d$ comes out of engagement with the inclined edge $3d$ and simultaneously therewith, the projection $5d$ which has so far been engaged with the first stepped portion $4c'$ of the play-back lever $1c$ is shifted to and restrained by the second stepped portion $4c''$, as shown in FIG. 3(B). FIG. 3(C) shows a position in which the push-in force imparted to the cue lever $1d$ has been released once the cue lever was pushed in as shown in FIG. 3(B). According to the present invention, as is apparent from FIG. 3(C), the position for play-back operation is maintained even if the cue is effected with the cue lever $1d$ pushed in during play-back operation and thus, the play-back operation may be resumed as soon as the cue is interrupted. If the cue is once effected during the play-back operation, the slider bar 5 will not be slidden even if the cue lever 1d is pushed in next time, because the projection 5d is not engageable by the inclined edge 3d of that lever 1d, as seen in FIG. 3(C), and the position for play-back operation as shown in FIGS. 3(B) and (C) may thus be maintained. When the projection 5c is shifted from the first stepped portion 4c' to the second stepped portion 4c" of the play-back lever 1c, the play-back lever 1c is somewhat retracted by an amount corresponding to the difference between the levels of these stepped portions, but of course, such retraction affects in no way the maintenance of the position for play-back operation.

For convenience, the foregoing description has been made with respect to a case where the cue is effected during play-back operation, but it will readily be appreciated that the above description is equally applicable to a case where the review is effected. Recording operation may be effected by pushing in the recording lever 1a and the play-back lever 1c at a time in the conventional manner, but it will also be apparent that if the cue lever 1d or the review lever 1b is pushed in during recording operation, the recording lever 1a alone will be released while the play-back lever 1c will intactly remain as has been described above.

In the above-described embodiment, each lever is provided with a through-aperture and these apertures are formed with inclined edges, restraining recesses and first and second stepped portions, whereas it will be appreciated that these through-apertures need not be provided but an inclined edge, a restraining recess stepped portions such as those described above may be formed on one side edge of each lever.

The present invention, as will be appreciated, can gain excellent benefits in that it can reliably perform the intended functions stated at the outset by a simple and economical construction in which the number of parts is reduced because of the levers being provided with the inclined edges, restraining recesses, first and second stepped portions so configured as described and a common slider bar being associated with each of those levers.

Figure 5:
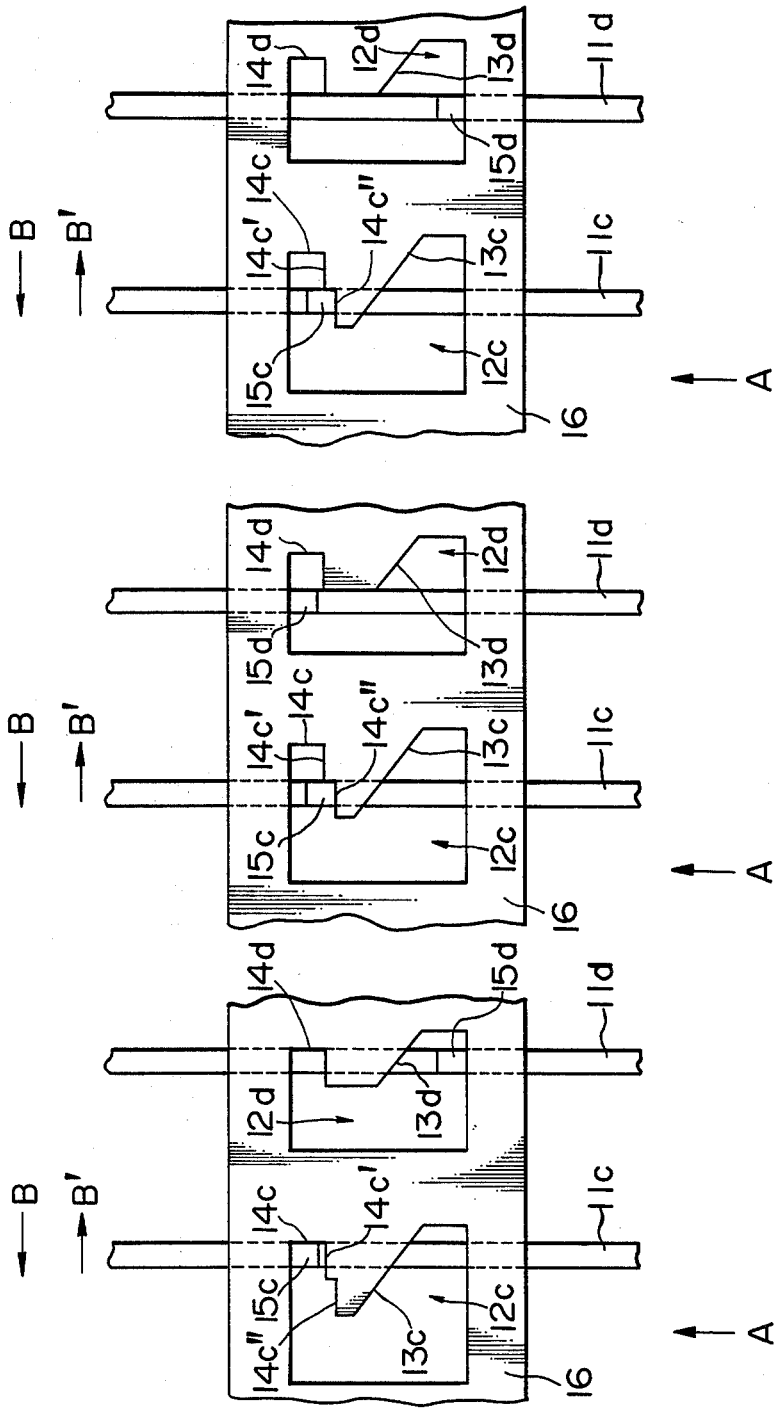

Referring to FIGS. 4 to 5, there is shown a second embodiment of this invention, wherein reference characters 11a to 11f designate a recording lever, a review lever, a play-back lever, a cue lever, a stop lever and an eject lever each having one end portion (lower end portion as viewed in FIG. 4) projected from a side wall of a chassis (not shown) and capable of being pushed in the direction of arrow A against the bias force of a spring. These levers 11a to 11f are formed with projections 15a to 15f, respectively.

Above the levers 11a to 11f (as viewed in FIG. 4), a slider bar 16 extends transversely of and perpendicularly to those levers and is slidable in a plane orthogonal to the surfaces of those levers. The slider bar 16 is spring-biased in the direction of arrow B. The slider bar 16 is formed with through-apertures 12a to 12f configures as shown in FIG. 4. The through-apertures 12a, 12a and 12d may be similar in configuration and are provided with inclined edges 13a, 13b and 13d and restraining recesses 14a, 14b and 14d. The through-aperture 12e has an inclined edge 13e but is formed with no restraining recess like those mentioned above. The through-aperture 12f is formed in an inverted L-shape. The through-aperture 12c has an inclined edge 13c and a restraining recess 14c, and it should be noted that the restraining recess 14c is provided with two stepped portions 14c' and 14c" at the forward edge thereof. The projections 15a to 15f are inserted in the through-apertures 12a to 12f, respectively.

Operation of this embodiment will now be described. First, to effect play-back operation, the play-back lever 11c is pushed in. Thereupon, the projection 15c of that lever comes into engagement with the inclined edge 13c of the through-aperture 12c, and as the lever 11c is pushed in progressively, the slider bar 16 is slidden in the direction of arrow B' against the spring bias; when the lever 11c has been fully pushed in, the projection 15c is inserted into the restraining recess 14c of the slider bar 16 by the spring bias and engaged with the first stepped portion 14c' of that recess, thus bringing about a position as shown in FIG. 5(A). In this manner, the position for play-back operation is brought about. In such position, if it is desired to effect the cue, for example, the cue lever 11d may be pushed in. By this, the projection 15d of the lever 11d is brought into engagement with the inclined edge 13d of the through-aperture 12d, so that the slider bar 16 is slidden in the direction of arrow B' from the position of FIG. 5(A) to a position in which the projection 15d comes out of engagement with the inclined edge 13d and simultaneously therewith, the projection 15c which has so far been engaged with the first stepped portion 14c' of the slider bar 16 is shifted to and restrained by the second stepped portion 14c", as shown in FIG. 5(B). FIG. 5(C) shows a position in which the push-in force imparted to the cue lever 11d has been released once the cue lever was pushed in as shown in FIG. 5(B). According to the present invention, as is apparent from FIG. 5(C), the position for play-back operation is maintained even if the cue is effected with the cue lever 11d pushed in during play-back operation and thus, the play-back operation may be resumed as soon as the cue is interrupted. If the cue is once effected during the play-back operation, the slider bar 16 will not be slidden even if the cue lever 1d is pushed in next time, because the inclined edge 13d is not engageable by the projection 15d of that lever 11d, as seen in FIG. 5(C), and the position for play-back operation as shown in FIGS. 2(B) and (C) may thus be maintained. Then the projection 15c is shifted from the first stepped portion 14c' to the second portion 14c" of the slider bar 16, the play-back lever 11c is somewhat retracted by an amount corresponding to the difference between the levels of these stepped portions, but of course, such retraction affects in no way the maintenance of the position for play-back operation.

For convenience, the foregoing description has been made with respect to a case where the cue is effected during play-back operation, but it will readily be appreciated that the above description is equally applicable to a case where the review is effected. Recording operation may be effected by pushing in the recording lever 11a and the play-back lever 11c at a time in the conventional manner, but it will also be apparent that if the cue lever 11d or the review lever 11b is pushed in during recording operation, the recording lever 11a alone will be released while the play-back lever 11c will intactly remain as has been described above.

In the above-described embodiment, the slider bar is provided with through-apertures and these apertures are formed with inclined edges, restraining recesses and first and second stepped portions, whereas it will be appreciated that these through-apertures need not be provided but inclined edges, restraining recesses and stepped portions such as those described above may be formed on one side edge of the slider bar.

The present invention, as will be appreciated, can gain excellent benefits in that it can reliably perform the intended functions stated at the outset by a simple and economical construction in which the number of parts is reduced because of the levers being provided with the inclined edges, restraining recesses, first and second stepped portions so configured as described and a common slider bar being associated with each of those levers.

Referring to FIGS. 6 to 8, there is shown a third embodiment of this invention, wherein reference characters 21a to 21e designate a recording lever, a review lever, a play-back lever, a cue lever and a stop lever each having one end portion (lower end portion as viewed in FIG. 6) projected from a side wall of a chassis (not shown) and capable of being pushed in the direction of arrow A against the bias force of a spring. Although not shown, an eject lever may also be provided. These levers 21a to 21e are formed with through-apertures 22a to 22e configured as shown in FIG. 6. The through-aperture 22a formed in the recording lever 21a is provided with an inclined edge 23a and a restraining recess 24a. The through-aperture 22c in the play-back lever 21c is formed with an inclined edge 23c and a restraining recess 24c, and the restraining recess 24c in turn is provided with two stepped portions 24c' and 24c'' at the forward edge thereof. However, these two stepped portions need not always be provided but instead of providing the stepped portion 24c'', the forward edge of the restraining recess 24c may be formed as an edge continuously extending in horizontal direction (as viewed in the drawing) or the forward edge may be somewhat inclined in the opposite direction to the inclined edge 23c. The through-aperture 22e in the stop lever 21e has an inclined edge 23e but is formed with no restraining recess like those mentioned above. The through-aperture 22b in the review lever 21b and the through-aperture 22d in the cue lever 21d may be substantially similar in configuration, and it should be noted that these through-apertures 22b and 22d are respectively provided with first inclined edges 23b and 23d, second inclined edges 23b' and 23d' opposite in direction to the first inclined edges, and restraining recesses 24b and 24d.

Below the levers 21a to 21e (as viewed in FIG. 6), a slider bar 25 extends transversely of and perpendicularly to those levers and is slidable in a plane orthogonal to the surfaces of those levers. The slider bar 25 is spring-biased in the direction of arrow B by a smaller spring force than that for each lever. The slider bar 25 has projections 25a to 25e formed integrally therewith at predetermined intervals, as shown in FIG. 7, and these projections 25a to 25e are inserted in the through-apertures 22a to 22e, respectively.

Operation of this embodiment will now be described. In FIG. 8, only the through-apertures and projections are shown for simplicity of illustration. Assume that the recording lever 21a and the cue lever 21d are pushed in by mistake to start the recording operation. The inclined edges 23a and 23d of the through-apertures 22a and 22d of these levers come into engagement with the projections 25a and 25d, respectively, and as the levers 21a and 21d are pushed in progressively, the slider bar 25 is slidden against the spring bias in the direction of arrow B' indicated in FIG. 6 and when these levers have been fully pushed in, the projection 25a is brought into engagement with the restraining recess 24a of the recording lever 1a while the projection 25d is not engaged with the restraining recess 24d of the cue lever 21d but positioned in spaced and opposed relationship with the distal end of the second inclined edge 23d', as shown in FIG. 8(A). In this position, if the push-in force imparted to the levers 21a and 21d is released, the second inclined edge 23d' of the lever 21d guides the projection 25d due to the return movement of the cue lever 21d to cause the slider bar 25 to be slidden in the direction of arrow B' because each lever is biased by a greater spring force then the slider bar as already noted, and as the result, the projection 25a comes out of engagement with the restraining recess 24a of the recording lever 21a, thereby immediately restoring the non-pushed-in position shown in FIG. 6. It will readily be appreciated that the foregoing description is equally applicable to a case where the recording lever 21a and the review lever 21b are pushed in at the same time.

When the play-back lever 21e and the cue lever 21d are pushed in at a time, the slider bar 25 is slidden in the direction of arrow B' in the same manner as described and, as shown in FIG. 8(B), the projection 25c is brought into engagement wih the stepped portion 24c' of the restraining recess 24c of the play-back lever 21c while the projection 25d is not engaged with the restraining recess 24d of the cue lever 21d but positioned in spaced and opposed relationship with the distal end of the second inclined edge 23d'. In this position, if the push-in force imparted to these levers is released, the slider bar 25 is slidden in the same manner as described, due to the engagement between the second inclined edge 23d' of the cue lever 21d and the projection 25d, whereby the projection 25c is shifted from the stepped portion 24c' to the stepped portion 24c'' and engaged with this latter stepped portion, with a result that the play-back lever 21c is held in its position for play-back operation, as shown in FIG. 8(C). It will readily be appreciated that what has been described above is equally applicable to a case where the play-back lever 21c and the review lever 21b are pushed in at the same time.

According to the present invention, as is apparent from the foregoing description, the desires mentioned at the outset can be satisfied at a time by a very simple construction.

In the above-described embodiment, each lever is provided with a through-aperture and these apertures are formed with inclined edges and restraining recesses, whereas these through-apertures need not be provided but an inclined edge and a restraining recess such as those described above may be formed on one side edge of each lever.

Figure 10:
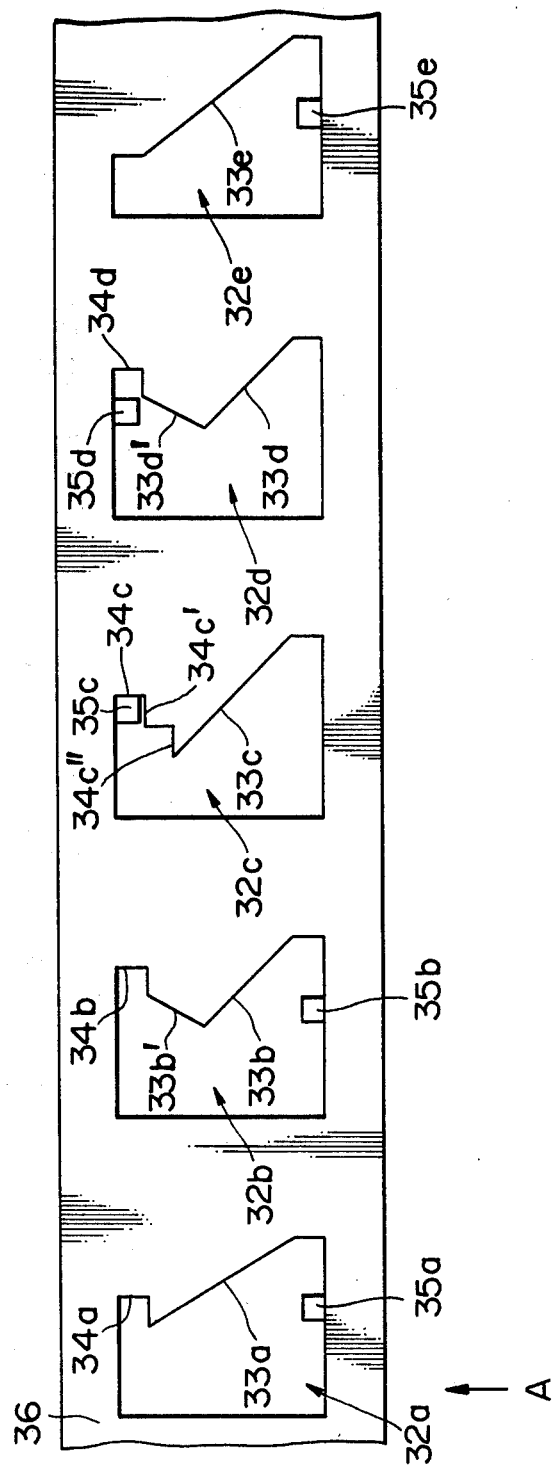
Figure 10:
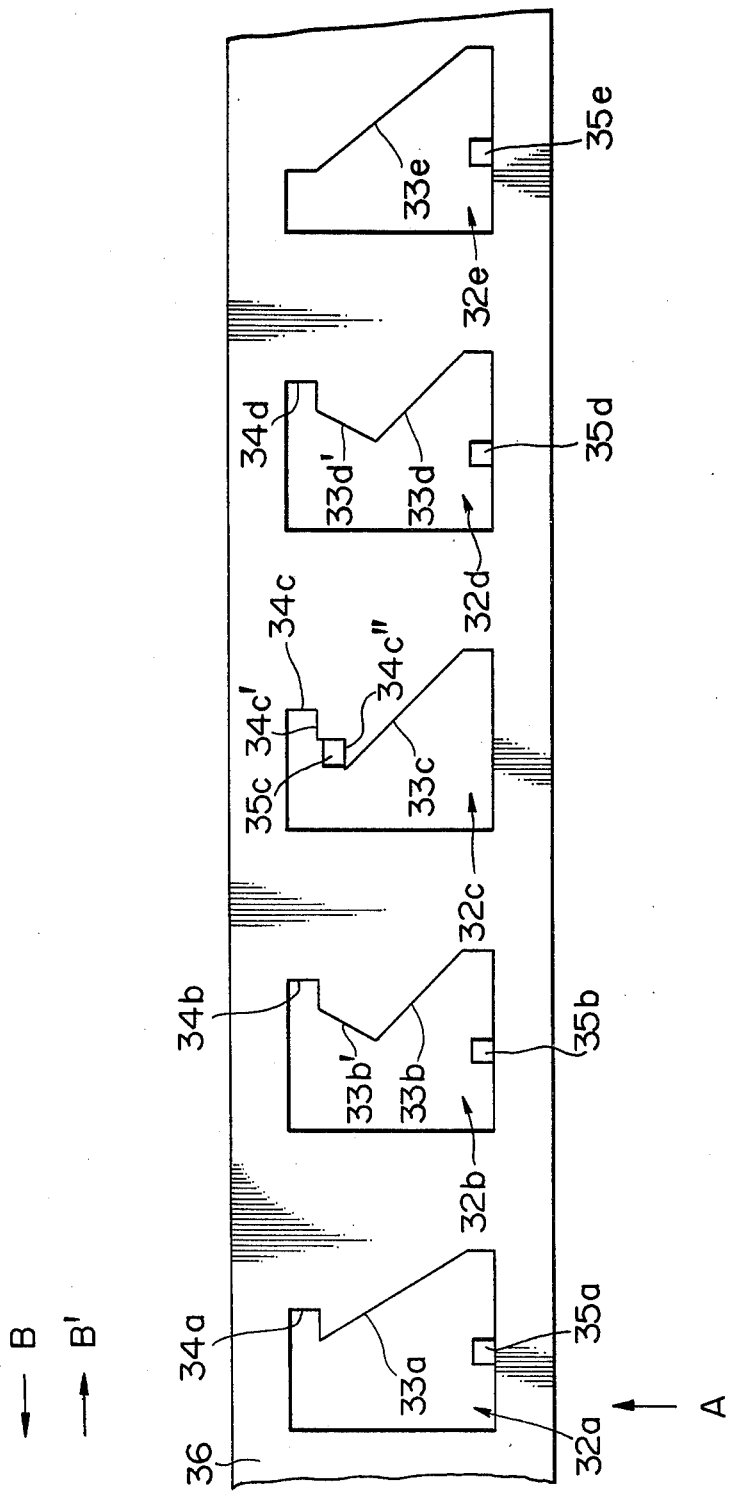

Referring to FIGS. 9 to 10, there is shown a fourth embodiment of this invention, wherein reference characters 31a to 31e designate a recording lever, a review lever, a play-back lever, a cue lever and a stop lever each having one end portion (lower end portion as viewed in FIG. 9) projected from a side wall of a chassis (not shown) and capable of being pushed in the direction of arrow A against the bias force of a spring. Although not shown, an eject lever may also be provided. These levers 31a to 31e are formed with projections 35a to 35e.

Above the levers 31a to 31e (as viewed in FIG. 9), a slider bar 36 extends transversely of and perpendicularly to those levers and is slidable in a plane orthogonal to the surfaces of those levers. The slider bar 36 is spring-biased in the direction of arrow B by a smaller spring force than that for each lever. The slider bar 36 has through-apertures 33a to 33e configured as shown in FIG. 9. The through-aperture 32a is provided with an inclined edge 33a and a restraining recess 34a. The through-aperture 32c is formed with an inclined edge 33c and a restraining recess 34c, and the restraining recess 34c in turn is provided with two stepped portions 34c' and 34c" at the forward edge thereof. However, these two stepped portions need not always be provided but instead of providing the stepped portion 34c" the forward edge of the restraining recess 34c may be formed as an edge continuously extending in horizontal direction (as viewed in the drawing) or the forward edge may be somewhat inclined in the opposite direction to the inclined edge 33c. The through-aperture 32e has an inclined edge 33e but is formed with no restraining recess like those mentioned above. The through-aperture 32b and the through-aperture 32d may be substantially similar in configuration, and it should be noted that these through-apertures 32b and 32d are respectively provided with first inclined edges 33b and 33d, second inclined edges 33b' and 33d' opposite in direction to the first inclined edges, and restraining recesses 34b and 34d. The projections 35a and 35e are inserted in the through-apertures 32a to 33e, respectively, as shown in FIG. 9.

Operation of this embodiment will now be described. In FIG. 10, the through-apertures in the slider bar and the projections are only shown for simplicity of illustration. Assume that the recording lever 31a and the cue lever 31d are pushed in by mistake to start the recording operation. The projections 35a and 35d of these levers come into engagement with the inclined edges 33a and 33d of the through-apertures 32a and 32d, and as the levers 31a and 31d are pushed in progressively, the slider bar 36 is slidden against the spring bias in the direction of arrow B' indicated in FIG. 9 and when these levers have been fully pushed in, the projection 35a of the recording lever 31a is brought into engagement with the restraining recess 34a of the through-aperture 32a while the projection 35d of the cue lever 31d is not engaged with the restraining recess 34d of the through-aperture 32d but positioned in spaced and opposed relationship with the distal end of the second inclined edge 33d', as shown in FIG. 2(A). In this position, if the push-in force imparted to the levers 31a and 31d is released, the projection 35d of the lever 31d guides the second inclined edge 33d' of the through-aperture 32d due to the return movement of the cue lever 31d to cause the slider bar 36 to be slidden in the direction of arrow B' because each lever is biased by a greater spring force than the slider bar as already noted, and as the result, the projection 35a of the recording lever 31a comes out of engagement with the restraining recess 34a of the through-aperture 32a, thereby immediately restoring the non-push-in position shown in FIG. 9. It will readily be appreciated that the foregoing description is equally applicable to a case where the recording lever 1a and the review lever 1b are pushed in at a time.

When the play-back lever 1e and the cue lever 31d are pushed in at a time, the slider bar 36 is slidden in the direction of arrow B' in the same manner as described and, as shown in FIG. 10(B), the projection 35c of the play-back lever 31c is brought into engagement with the stepped portion 34c' of the restraining recess 34c of the through-aperture 32c while the projection 35d is not engaged with the restraining recess 34d of the cue lever 31d but positioned in spaced and opposed relationship with the distal end of the second inclined edge 33d'. In this position, if the push-in force imparted to these levers is released, the slider bar 36 is slidden in the same manner as described, due to the engagement between the second inclined edge 33d' of the through-aperture 32d and the projection 35d of the cue lever 31d, whereby the projection 35c is shifted from the stepped portion 34d' to the stepped portion 34c" and engaged with this latter stepped portion, with a result that the play-back lever 31c is held in its position for play-back operation, as shown in FIG. 10(C). It will readily be appreciated that what has been described above is equally applicable to a case where the play-back lever 31c and the review lever 31b are pushed in at the same time.

According to the present invention, as is apparent from the foregoing description, the desires mentioned at the outset can be satisifed at a time by a very simple construction.

In the above-described embodiment, the slider bar is provided with through-apertures and these apertures are formed with inclined edges and restraining recesses, whereas these through-apertures need not be provided but inclined edges and restraining recesses such as those described above may be formed on one side edge of the slider bar.

Although the present invention has been described with respect to some specific embodiments, it is to be understood that the invention is not restricted thereto but covers any and all modifications and changes which may be made within the scope of the appended claims.

What is claimed is:

1. An operating mechanism of a tape recorder comprising a play-back lever and at least one of a review lever or a cue lever, each lever capable of being pushed in against a spring bias, and a common slider bar extending transversely to the length of each said lever and slidable in a plane orthogonal to the major surface of each said lever, characterized in that said slider bar is provided with a plurality of projections formed at predetermined intervals and associated with respective ones of said levers, said review lever and said cue lever are formed with inclined edges effective to engage said projections to guide said projections in a predetermined direction when said levers are pushed in, thereby sliding said slider bar in said direction, and restraining recesses effective to restrain said projections to hold said slider bar in said slidden position, said play-back lever is formed with an inclined edge and a restraining recess functionally similar to said inclined edges and said restraining recesses, said restraining recess in said play-back lever is provided with a first and a second stepped portion, so that when said play-back lever is pushed in, said projection associated with said play-back lever may first be restrained by said first stepped portion and in such position, when said review lever or said cue lever is pushed in, said slider bar may be slidden in said direction, whereby said projection associated with said play-back lever may be shifted from said first stepped portion to said second stepped portion and restrained by said second stepped portion, and in this latter position, even if said review lever or said cue lever is pushed in, said slider bar may not be slidden but said play-back lever may be held in said pushed-in position.

2. An operating mechanism of a tape recorder comprising a play-back lever and at least one of a review lever or a cue lever, each lever capable of being pushed in against a spring bias, and a common slider bar extending transversely to the length of said lever and slidable in a plane orthogonal to the major surface of each said lever, characterized in that said play-back, review and cue levers are provided with projections associated with said slider bar, said slider bar is formed with inclined edges effective to engage said projections when said review lever and said cue levers are pushed in, thereby sliding said slider bar in a predetermined direction, and restraining recesses effective to restrain said projections to hold said slider bar in said slidden position, said slider bar associated with the projection of said play-back lever is formed with an inclined edge and a restraining recess functionally similar to said inclined edges and said restraining recesses, said restraining recess in said slider bar is provided with a first and a second stepped portion, so that when said play-back lever may first be restrained by said first stepped portion and in such position, when said review lever or said cue lever is pushed in, said slider bar may be slidden in said direction, whereby said projection of said play-back lever may be shifted from said first stepped portion to said second stepped portion and restrained by said second stepped portion, and in this latter position, even if said review lever or said cue lever is pushed in, said slider bar may not be slidden but said play-back lever may be held in said pushed-in position.

3. An operating mechanism of a tape recorder comprising a recording lever, a play-back lever and at least one of a review lever, or a cue lever each lever capable of being pushed in against a spring bias, and a slider bar extending transversely of and perpendicularly to the length of each said lever and slidable in a plane orthogonal to the major surface of each said lever and having a plurality of projections formed at predetermined intervals and associated with respective ones of said levers, said slider bar being spring-biased in a predetermined direction, so that if the review lever or the cue lever is pushed in either when the recording lever and the play-back lever have been pushed in for the recording operation or when the play-back lever has been pushed in for the play-back operation, a position in which the play-back operation can be immediately started may be maintained upon release of the push-in force in both of said cases, characterized in that said review or said cue lever is provided with means cooperable with an associated one of said projections so that when said recording lever and said review lever or said cue lever have been pushed in at a time, both of said levers are returned to their non-pushed-in position upon release of the push-in force and when said play-back lever and said review lever or said cue lever have been pushed in at a time, said review lever or said cue lever is returned to its non-pushed-in position upon release of the push-in force while said play-back lever is held in its pushed-in position corresponding to the position for play-back operation.

4. An operating mechanism of a tape recorder comprisng a recording lever, a play-back lever and at least one of a review lever, or a cue lever each lever capable of being pushed in against a spring bias, and a slider bar extending transversely of and perpendicularly to the length of each said lever and slidable in a plane orthogonal to the major surface of each said lever and spring-biased in a predetermined direction, each of said levers being provided with a projection associated with said slider bar, so that if the review lever or the cue lever is pushed in either when the recording lever and the play-back lever have been pushed in for the recording operation or when the play-back lever has been pushed in for the recording operation or when the play-back lever has been pushed in for the play-back operation, a position in which the play-back operation can be immediately started may be maintained upon release of the push-in force in both of said cases, characterized in that said slider bar is provided with means cooperable with an associated one of said projections so that when said recording lever and said review lever or said cue lever have been pushed in at a time, both of said levers are returned in their non-pushed-in position upon release of the push-in force and when said play-back lever and said review lever or said cue lever have been pushed in at a time, said review lever or said cue lever is returned to its non-pushed-in position upon release of the push-in force while said play-back lever is held in its pushed-in position corresponding to the position for play-back operation.

* * * * *